(12) United States Patent
Blasco Claret et al.

(10) Patent No.: US 7,251,114 B2
(45) Date of Patent: Jul. 31, 2007

(54) OVERVOLTAGE PROTECTING CIRCUIT IN A STEADY STATE

(75) Inventors: Jorge Vicente Blasco Claret, Valencia (ES); Antonio Poveda Lerma, Foyos (ES); Antonio Pairet Molina, Sagunto (ES); José Luís González Moreno, Xirivella (ES); Francisco Andrés Navarro, Valencia (ES)

(73) Assignee: Diseno de Sistemas en Silicio, S.A., Paterna, Valencia (ES)

( * ) Notice: Subject to any disclaimer, the term of this patent is extended or adjusted under 35 U.S.C. 154(b) by 0 days.

(21) Appl. No.: 11/086,838

(22) Filed: Mar. 22, 2005

(65) Prior Publication Data

US 2005/0162801 A1   Jul. 28, 2005

Related U.S. Application Data

(63) Continuation of application No. PCT/ES02/00471, filed on Oct. 8, 2002.

(51) Int. Cl.
*H02H 9/00* (2006.01)
(52) U.S. Cl. ...................... 361/127; 361/120
(58) Field of Classification Search ................ 361/118, 361/120, 127
See application file for complete search history.

(56) References Cited

U.S. PATENT DOCUMENTS 4,571,656 A  *  2/1986  Ruckman ..................... 361/56

4,625,255 A  *  11/1986  Borkowicz et al. ......... 361/119

FOREIGN PATENT DOCUMENTS

ES  WO 2004/034545 A1 *  4/2004
JP        63-048124         2/1988

* cited by examiner

*Primary Examiner*—Stephen W. Jackson
(74) *Attorney, Agent, or Firm*—Klauber & Jackson LLC

(57) ABSTRACT

The invention relates to an overvoltage protection circuit comprising an MOV (Metal Oxide Varistor) voltage limiting device (3) which is disposed in series with a GDT (Gas Discharge Tube) voltage limiting device (4). The invention is characterized in that a resistor (5) is disposed in parallel with the aforementioned GDT device (4), the value of said resistor being such that the voltage supported by the GDT device (4) is less than the holdover voltage thereof. In another embodiment of the invention, a second resistor (6) is disposed in parallel with the MOV device (3) and, together with the above-mentioned resistor (5), forms a resistive divider such that the voltage applied the GDT device (4) under steady-state conditions is less than the holdover voltage of the GDT. The invention is suitable for communication systems and, preferably, for applications involving communication via electrical network, since the protection effectiveness is improved owing to the fact that the holdover voltage of the GDT device (4) must be less than that normally required.

2 Claims, 1 Drawing Sheet

OVERVOLTAGE PROTECTING CIRCUIT IN A STEADY STATE

RELATED APPLICATIONS

The present application is a Continuation of co-pending PCT Application No. PCT/ES02/00471, filed on Oct. 8, 2002. Applicants claim the benefits of 35 U.S.C. §120 as to the PCT application, and the entire disclosure of the application is incorporated herein by reference in its entirety.

TECHNICAL FIELD OF THE INVENTION

Comprises an MOV voltage limiter (3) (Metal Oxide Varistor) placed in series with a GDT voltage limiter (4) (Gas discharge tubes); characterized in that in parallel with the GDT device (4) a resistor (5) is situated whose value is such that the voltage supported by the GDT device (4) is less that its holdover voltage.

In another embodiment of the invention, a resistor (6) is placed in parallel to the MOV device (3) that along with the resistor (5) forms a resistive divider so that the voltage that the GDT device (4) is submitted to in steady state conditions is less than the holdover voltage of the GDT.

This invention is recommended for communication systems, preferably in communication applications over the electricity network because it increases the efficiency of the protection by requiring that the holdover voltage of the GDT device (4) is less that than conventionally required.

OBJECT OF THE INVENTION

This invention consists of a voltage surge arrestor to protect devices susceptible to damage when the voltage applied between their power terminals exceeds a maximum acceptable threshold.

The invention is applicable to the field of telecommunications, preferably in broadband applications over the electricity network where protection against voltage surges is carried out by means of MOV (Metal Oxide Varistor) devices based on semiconductors and placed in series with a GDT limiter (Gas discharge tubes); and where the objective is to eliminate the problems that these types of devices present when voltage surge protection is carried out.

BACKGROUND OF THE INVENTION

A variety of devices are available on the market that are designed to protect those devices that are susceptible to damage by voltage surge when the voltage applied between their power terminals exceeds a maximum acceptable threshold.

In this sense, the devices most used are MOV, based on semiconductors and the like, as well as GDT devices. The use of hybrid arrestors based on a combination of MOV and GDT devices is also known.

MOV devices are fast acting which is very desirable in certain applications, but with the inconvenience of not being able to absorb an unlimited number of surges, that is, they degrade with use and in the end fail. The number of times an MOV device shall function correctly depends on the energy absorbed each time it functions. Furthermore, there is the inconvenience that they may short circuit in case of malfunction so that it is necessary to anticipate some other type of protection against this inconvenience. Furthermore these MOV devices have relatively high capacity. With regard to the GDT devices, it must be stated that these are slower acting devices that function by producing an electric arc in their interior when nominal voltage is surpassed. When in action impedance between their terminals diminishes drastically causing a short circuit. They have relatively small capacity making them ideal for use in telecommunications.

As a solution to these problems the use of GDT devices in combination with MOV devices connected in series between the terminals of the element to be protected is known. This combination has the advantage that taken together capacity is approximately equal to that of the GDT device (a few pF) and protection is similar to that of the MOV but without short-circuiting the line while the protection is in action. However it must be stated that the combination of these devices have one important inconvenience that is the GDT device needed to carry out effective protection must have a holdover voltage greater than the working voltage of the communication line, which requires the use of GDT devices with very high nominal voltage.

Due to the difference of capacity between the MOV device (high capacity) and the GDT device (very low capacity), the voltage capacitive divider formed by both devices causes almost all the voltage to be applied to the GDT device so that when a voltage surges occurs on the line, the GDT device turns the MOV device on, limiting the voltage absorbing the transient energy, but when the voltage surge ends and voltage on the line returns to its nominal value, if the holdover voltage of the GDT device is below maximum voltage on the line it beings to impulsively start and stop the capacitance of the MOV causing a malfunction and this is translated to noise in the channel something which is not admissible in telecommunications applications.

DESCRIPTION OF THE INVENTION

To solve the inconveniences indicated previously, this invention has developed an circuit protection against voltage surges for communication applications that like conventional circuits comprises an MOV voltage limiter placed in series with a GDT limiter but with the novelty of placing a resistor in parallel with the GDT limiter where the value of the resistor is such that the voltage that the GDT voltage limiter device supports is less than its holdover voltage required, thereby avoiding the problems mentioned previously.

In another embodiment of this invention, as well as the resistor placed in parallel with the GDT limiter, another resistor is included in parallel with the MOV limiter, so that these form a resistive divider that limits the voltage the GDT device is submitted to in steady state, so that the voltage mentioned that the GDT device is submitted to in steady state is less that the holdover voltage of said GDT device, thereby resolving the problems mentioned in the previous section.

The following drawings are provided to facilitate a better understanding of the present invention and while forming an integral part of the detailed description and the claims, they offer an illustrative but not limited representation of the principles of this invention.

DESCRIPTION OF AN EMBODIMENT OF THE INVENTION

Figure 1:
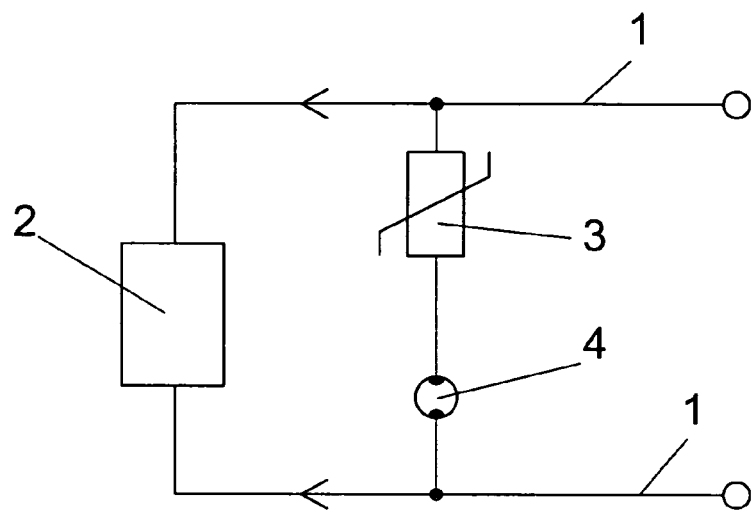
FIG. 1. Shows a conventional voltage surge arrestor.
Figure 2:
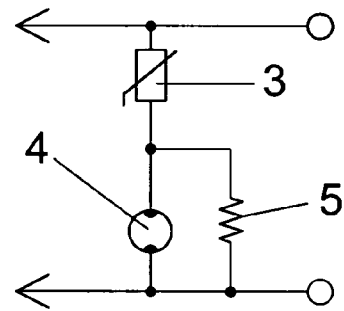
FIG. 2. Shows a possible example of the arrestor described in the current invention.
Figure 3:
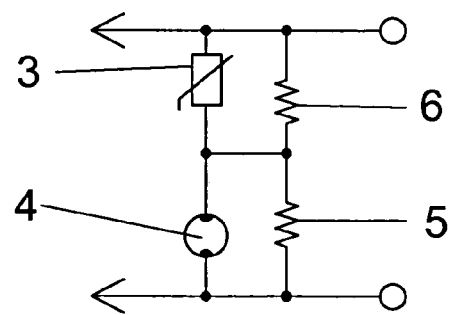
FIG. 3. Shows another possible example of the arrestor described in this invention.

The following is a description of the invention based on the Figures mentioned previously.

As previously mentioned, the invention concerns a arrestor against voltage surges that are produced in a communications channel 1 to protect an element 2 (of any type), and for which in parallel with the aforementioned element 2 an MOV voltage limiter device is included 3 and which is placed in series with a GDT limiter device 4. This description corresponds to one type of circuit conventionally used to carryout voltage surge protection in communication lines.

The novelty of this invention, according to one embodiment of same, stems from the fact that in parallel with the GDT device 4 a resistor 5 is connector so that knowing the capacity of the MOV device 3 to the frequencies used in the communication, it is possible to calculate the value of the resistor 5 so that the voltage supported by the GDT device 4 will be less than its holdover voltage, thereby resolving the problems mentioned in the section on the background to the invention.

In a second embodiment of the invention, as well as the resistor 5 placed in parallel with the GDT device 4, the use of a resistor 6 in parallel with the MOV device 3 is foreseen, whereby the resistors 5 and 6 constitute a voltage divider so that the voltage that the GDT 4 device is submitted to in stationary regime is less than the holdover voltage of the GDT 4 and therefore, the problems mentioned in the previous section on the background to the invention are also avoided in this embodiment.

The invention claimed is:

1. A arrestor against voltage surges, that consists of a MOV voltage limiter (3) (Metal-oxide Varistors) placed in series with a GDT voltage limiter (4) (Gas Discharge tubes); characterized in that parallel to the GDT voltage limiter device (4) it comprises a resistor (5) with a value such that the voltage that the GDT voltage limiter device supports is less than its holdover voltage required to maintain it on.

2. A arrestor against voltage surges, according to claim 1, characterized in that in parallel to the MOV voltage limiter device (3) it comprises a resistor (6) that along with the resistor (5) placed in parallel with the GDT voltage limiter device (4) forms a resistive divider so that the voltage that the GDT device (4) is submitted to in steady state conditions is less that the holdover voltage required to maintain the GDT on (4).

* * * * *